United States Patent
Thometzek

Patent Number: 5,348,915
Date of Patent: Sep. 20, 1994

[54] HIGH-GLOSS CERAMIC FRITS

[75] Inventor: Peter Thometzek, Spezzano di Fiorano, Italy

[73] Assignee: Ferro Corporation, Cleveland, Ohio

[21] Appl. No.: 34,488

[22] Filed: Mar. 19, 1993

[30] Foreign Application Priority Data

Mar. 31, 1992 [IT] Italy .................. MI92 A 000771

[51] Int. Cl.$^5$ .................. C03C 3/105; C03C 8/02
[52] U.S. Cl. ...................... 501/24; 501/21; 501/63; 501/67; 501/69; 501/70; 501/72
[58] Field of Search ............ 501/21, 63, 67, 69, 501/70, 72, 17, 18, 24, 26

[56] References Cited

U.S. PATENT DOCUMENTS

| | | | |
|---|---|---|---|
| 3,017,279 | 1/1962 | Van Dolah et al. | 501/21 |
| 3,836,373 | 9/1974 | Ault et al. | 501/65 |
| 4,297,141 | 10/1981 | Tokunaga et al. | 501/67 |
| 4,340,645 | 7/1982 | O'Conor | 501/17 |
| 4,562,161 | 12/1985 | Mennemann et al. | 501/67 |

OTHER PUBLICATIONS

Volf, *Chemical Approach to Glass* pp. 319, 321 & 322, 1984.

Grant, *Chemical Dictionary*, p. 594, 1989.

P. Vincenzini, G. Biffi and G. Ortelli, "TiO$_2$ as an Opacifer of Ceramic Glazes Firing in the Range 900°–1100°C." *Ceramurgia*, 5, (1975), pp. 3–12.

K. H. Styhr, Jr. and M. D. Beals, "Use of Titanium Dioxide in Self-Opacifying Glazes", *Ceramic Bulletin*, vol. 37, No. 11 (1958) pp. 480–485.

*Primary Examiner*—Mark L. Bell
*Assistant Examiner*—Deborah Jones
*Attorney, Agent, or Firm*—Rankin, Hudak & Hill

[57] ABSTRACT

Lead-free ceramic frits for producing glazes with intrinsic opacity, and methods of coationg ceramic substrates with the ceramic frits, wherein the ceramic frits have the following composition:

| | |
|---|---|
| SiO$_2$ | 48–60 wt. % |
| B$_2$O$_3$ | 3–8 wt. % |
| Al$_2$O$_3$ | 4–8 wt. % |
| Na$_2$O | 0.2–2.0 wt. % |
| K$_2$O | 4–8 wt. % |
| MgO | 0–2 wt. % |
| CaO | 7.5–13 wt. % |
| BaO | 0–5 wt. % |
| ZnO | 7–12 wt. % |
| ZrO$_2$ | 0.3–2.5 wt. % |
| TiO$_2$ | 3.5–5.5 wt. % |
| P$_2$O$_5$ | 0–3 wt. % and |
| Na$_2$O + K$_2$O | 4.5–8.5 wt. %. |

6 Claims, No Drawings

HIGH-GLOSS CERAMIC FRITS

BACKGROUND OF THE INVENTION

1. Field of the Invention

The invention relates to ceramic frits having excellent whiteness and covering power and also having a very high gloss and very little wrinkling after high-speed ceramic baking between 980° C. and 1150° C., the frits being free from the toxic element lead.

2. Description of the Related Art

Numerous ceramic frits for stoving on ceramic substrates are known from the literature.

For example P. Vincenzini et al. in Ceramurgia 5, No. 1, page 3 (1975) describe $TiO_2$ frits having the following composition:

| | | |
|---|---|---|
| $SiO_2$ | 51–61 | wt. % |
| $Al_2O_3$ | 5–8 | wt. % |
| $B_2O_3$ | 9–14 | wt. % |
| $TiO_2$ | 4.5–7.5 | wt. % |
| PbO | 0–7 | wt. % |
| CaO | 4–7 | wt. % |
| $Na_2O$ | 2.5–5 | wt. % |
| $K_2O$ | 0–1 | wt. % |

These frits, however, are unsuitable for high-speed baking on porous unbaked bodies. The edge softening point is too low, i.e. the frit sinters before the body has completely degassed. This results in faulty, blistery glaze coatings. The frits are also unsuitable for high-speed baking on baked bodies. During baking, they give faulty surfaces owing to formation of pits, dents or pin-holes. These lead-containing frits are also very hazardous for toxic and ecological reasons.

British patents 808 041 describes frits having the following composition:

| | | |
|---|---|---|
| $SiO_2$ | 50–65 | mol. % |
| $Al_2O_3$ | 4–12 | mol. % |
| $TiO_2$ | 6–18 | mol. % |
| $ZrO_2$ | 0–6 | mol. % |
| $Na_2O$ or $Na_2O + K_2O$ | 10–18 | mol. % |
| $Na_2O$ | $\geq 5$ | mol. % |
| MgO + CaO + SrO | 5–15 | mol. % |

These substances likewise are unsuitable for high-speed baking and give yellowish glazes. The high $TiO_2$ content also increases the expense of the frits.

K. H. Styhr and M. D. Beals in Ceramic Bulletin 37, No. 11, page 480 (1958) describe frits having the composition:

| | | |
|---|---|---|
| $SiO_2$ | 55–65 | wt. % |
| $B_2O_3$ | 6–12 | wt. % |
| $Al_2O_3$ | 6–14 | wt. % |
| $TiO_2$ | 5–20 | wt. % |
| $Na_2O$ | 4–10 | wt. % |
| $K_2O$ | 0–8 | wt. % |
| $Li_2O$ | 0–8 | wt. % |
| PbO | 0–6 | wt. % |
| ZnO | 0–10 | wt. % |
| MgO | 0–8 | wt. % |
| CaO | 0–4 | wt. % |
| SrO | 0–4 | wt. % |
| BaO | 0–6 | wt. % |

These also give glazes with a faulty blistery surface after ceramic high-speed baking.

DESCRIPTION OF THE INVENTION

The aim therefore is to provide ceramic frits which produce fault-free glazes after high-speed baking and also have good covering power and high gloss.

The invention therefore relates to ceramic frits for producing glazes with white opacity and covering power through ceramic high-speed baking at temperatures between 980° C. and 1150° C., characterised in that the ceramic frits have the following composition:

| | | |
|---|---|---|
| $SiO_2$ | 48–60 | wt. % |
| $B_2O_3$ | 3–8 | wt. % |
| $Al_2O_3$ | 4–8 | wt. % |
| $Na_2O$ | 0.2–2.0 | wt. % |
| $K_2O$ | 4–8 | wt. % |
| MgO | 0–2 | wt. % |
| CaO | 7.5–13 | wt. % |
| BaO | 0–5 | wt. % |
| ZnO | 7–12 | wt. % |
| $ZrO_2$ | 0.3–2.5 | wt. % |
| $TiO_2$ | 3.5–5.5 | wt. % |
| $P_2O_5$ | 0–3 | wt. % and |
| $Na_2O + K_2O$ | 4.5–8.5 | wt. %. |

Ceramic frits having the following composition are particularly preferred:

| | | |
|---|---|---|
| $SiO_2$ | 52–60 | wt. % |
| $B_2O_3$ | 4–7 | wt. % |
| $Al_2O_3$ | 4–7 | wt. % |
| $Na_2O$ | 1–2 | wt. % |
| $K_2O$ | 4–6.5 | wt. % |
| MgO | 1–2 | wt. % |
| CaO | 9–11 | wt. % |
| ZnO | 8–10 | wt. % |
| $ZrO_2$ | 0.5–1.0 | wt. % |
| $TiO_2$ | 4.5–5.5 | wt. % |
| $P_2O_5$ | 0.1–2.2 | wt. and |
| $Na_2O + K_2O$ | 4.5–8.5 | wt. %. |

Surprisingly, the recrystallisation of $TiO_2$, which determines the brightness, can be controlled by adding small quantities of $ZrO_2$, which melts in the form of $ZrSiO_4$ in the batch, thus critically improving the brightness of the glaze. $ZrO_2$ must be added in a proportion of 0.3 to 2.5 wt. %, preferably 0.5 to 1.0 wt. %.

Surprisingly, the recrystallisation of $TiO_2$ and consequently the white opacity can also be critically controlled by varying the proportion of $P_2O_5$. $P_2O_5$ is incorporated by melting in a proportion of 0 to 3 wt. %, preferably 0.1 to 2.2 wt. %. The $P_2O_5$ can be introduced into the melt via the $TiO_2$.

By using $ZrO_2$ and $P_2O_5$ to influence the opacity, the $TiO_2$ content of the frits according to the invention can be reduced to 3.5 to 5.5 wt. %. This advantageously affects the cost of manufacture, by simultaneously reducing the cost of the raw material and reducing the cost of melting owing to the ease of melting.

The $Na_2O$ content must be between 0.2 and 2 wt. %. As a result, the edge softening point of the frits is above 900° C., i.e. they are extremely suitable for Monoporosa high-speed baking and, in the preferred range of application between 980° and 1150° C., give glazes having high surface smoothness, i.e. very little wrinkling and high gloss. When used in double high-speed baking (bicottura rapida), there is no undesirable migration of salts leading to surface faults during baking.

The $K_2O$ content is about 4 to 8 wt. %, and the sum of $Na_2O + K_2O$ is about 4.5 to 8.5 wt. %. The resulting thermal expansion coefficient for the frits according to the invention is in the range from 55 to $75 \cdot 10^{-6} K^{-1}$ between 20° C. and 40° C., which matches the thermal expansion of the ceramic body.

The $B_2O_3$ content is between 3 and 8 wt. %. Smaller quantities cause a loss of gloss, whereas higher proportions result in edge softening points which are too low for high-speed Monoporosa baking.

The MgO content is 0 to 2 wt. %. A higher content results in dulling or reduction of gloss. If the CaO content is 7.5 to 13 wt. % and the ZnO content is 7 to 12 wt. %, the result is a high-gloss smooth glaze. If the proportions are lower, the viscosity of the frits in the claimed temperature range is too low, whereas higher proportions may result in a loss of gloss.

The frits according to the invention do not contain the toxic element lead or the element fluorine, i.e. they are not a toxicological or ecological hazard.

The $TiO_2$ frits according to the invention have considerable advantages over white frits based on precipitation of $ZrSiO_4$ and hitherto used on a large industrial scale. On the one hand the frits according to the invention melt much more easily and do not tend to precipitate in the melting furnaces as in the case of frits containing $ZrSiO_4$ which can result in considerable difficulties in production. On the other hand, owing to their $ZrSiO_4$ lower viscosity (particularly at higher temperatures), they give smoother surfaces on baking, resulting in considerably higher gloss.

The frits according to the invention are used for producing glazes on ceramic substrates.

For wet application it is conventional to use a glaze slip consisting of at least 65 wt. % of one or more of the frits according to the invention together with one or more substances from the following group: kaolin, bentonite, China clay, quartz, aluminum oxide, molochite, feldspar, talc, pigments and opacifiers.

It is preferable to use glaze slips containing at least 85 wt. % of one or more of the frits according to the invention, in order to obtain a high-gloss fault-free surface. The frits according to the invention or the glaze slips are preferably used in the temperature range between 980° C. and 1150° C. for coating ceramic tiles after high-speed Monoporosa baking or high-speed double baking.

The frits are also suitable as component of a glaze slip for high-speed single baking on sealing-tight bodies at elevated temperature.

Of course, the frits according to the invention can also be used in conventional baking (not high-speed; 3 to 48 hours). In addition to the tile sector, there are applications to sanitary ceramics and the crockery industry.

The frits according to the invention, therefore, when applied to bodies for glazing, can be in the form of a ceramic slip applied when wet. Alternatively, powder electrostatic dry application is advantageous, or dry application in the form of a granulated product after suitable processing.

The invention will be explained in detail with reference to the following examples.

EXAMPLES

Example 1

94 parts by weight of frit A, 6 parts by weight of kaolin and 60 parts by weight of water were ground in a ball mill for 2 hours to form a ceramic slip. After spraying onto a porous unbaked body, drying and baking at 1085° C. for 41 minutes, the product was a high-gloss smooth white glaze with higher covering power and a faultless surface.

Example 2

99.85 parts by weight of frit A and 0.15 g of a mixture of polymethyl hydrogen siloxanes having the formula:

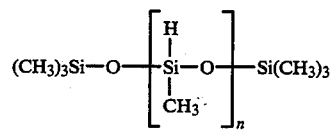

with n=5 to 50 were ground in a ball mill until the particle-distribution maximum was below 50 μm and less than 10 wt. % of the grains were larger than 100 μm and 100 wt. % were smaller than 150 μm.

The resulting powder was electrostatically applied to a porous unbaked body at 50 kV.

After baking at 1085° C. for 41 minutes, the product was a high-gloss glaze with high covering power and brightness and a faultfree surface.

Example 3

96 parts by weight of frit B, 4 parts by weight of kaolin and 35 parts by weight of water were ground in a ball mill for 2 hours to form a ceramic slip. After pouring onto a pre-baked ceramic body, drying and baking at 1030° C. for 40 minutes, the product was a white glaze with high gloss. There were no observable surface faults such as dents, pits or pin-holes.

Example 4

96 parts by weight of frit C, 4 parts by weight of kaolin, 0.4 parts by weight of sodium carboxymethyl cellulose and 50 parts by weight of water were ground in a ball mill to obtain a ceramic slip. After spraying onto a porous unbaked ceramic body, drying and high-speed baking at 1120° C. for 50 minutes, the product was a high-gloss white glaze with a fault-free surface.

Example 5

The process was as in Example 4 except that frit D was used. After spraying onto a porous ceramic unbaked body, drying and high-speed baking at 1150° C. for 35 minutes, the product was a white glaze with high covering power, high gloss and excellent surface quality.

| Composition | Frit A [wt. %] | Frit B [wt. %] | Frit C [wt. %] | Frit D [wt. %] |
|---|---|---|---|---|
| $SiO_2$ | 54.2 | 53.2 | 51.2 | 50.9 |
| $B_2O_3$ | 5.4 | 6.4 | 6.4 | 6.4 |
| $Al_2O_3$ | 6.1 | 6.1 | 6.1 | 7.1 |
| $Na_2O$ | 1.5 | 1.5 | 1.5 | 0.5 |
| $K_2O$ | 6.1 | 6.1 | 6.1 | 7.6 |
| MgO | 1.6 | 1.6 | 1.6 | 1.6 |
| CaO | 10.0 | 10.0 | 10.0 | 10.0 |
| ZnO | 8.9 | 8.9 | 8.9 | 8.4 |
| $TiO_2$ | 5.0 | 5.0 | 5.0 | 5.0 |
| $ZrO_2$ | 1.0 | 1.0 | 1.0 | 0.3 |
| $P_2O_5$ | 0.2 | 0.2 | 2.2 | 2.2 |

What is claimed is:

1. Lead-free ceramic frits for producing glazes with intrinsic opacity, wherein the ceramic frits have the following composition:

| | | |
|---|---|---|
| $SiO_2$ | 48–60 | wt. % |
| $B_2O_3$ | 3–8 | wt. % |
| $Al_2O_3$ | 4–8 | wt. % |
| $Na_2O$ | 0.2–2.0 | wt. % |
| $K_2O$ | 4–8 | wt. % |
| MgO | 1–2 | wt. % |
| CaO | 7.5–13 | wt. % |
| BaO | 0–5 | wt. % |
| ZnO | 7–12 | wt. % |
| $ZrO_2$ | 0.3–2.5 | wt. % |
| $TiO_2$ | 3.5–5.5 | wt. % |
| $P_2O_5$ | .1–3 | wt. % and |
| $Na_2O + K_2O$ | 4.5–8.5 | wt. %. |

2. Ceramic frits according to claim 1, wherein the ceramic frits have the following composition:

| | | |
|---|---|---|
| $SiO_2$ | 52–60 | wt. % |
| $B_2O_3$ | 4–7 | wt. % |
| $Al_2O_3$ | 4–7 | wt. % |
| $Na_2O$ | 1–2 | wt. % |
| $K_2O$ | 4–6.5 | wt. % |
| MgO | 1–2 | wt. % |
| CaO | 9–11 | wt. % |
| ZnO | 8–10 | wt. % |
| $ZrO_2$ | 0.5–1.0 | wt. % |
| $TiO_2$ | 4.5–5.5 | wt. % |
| $P_2O_5$ | 0.1–2.2 | wt. and |
| $Na_2O + K_2O$ | 4.5–8.5 | wt. %. |

3. A glaze slip for producing glazes on ceramic substrates, wherein the glaze slip contains at least 65 wt. % of a frit according to claim 1 and one or more of the substances from the following group: kaolin, bentonite, China clay, quartz, aluminum oxide, molochite, feldspar, talc, pigments and opacifiers.

4. A glaze slip for producing glazes on ceramic substrates, wherein the glaze slip contains at least 65 wt. % of a frit according to claim 2 and one or more of the substances from the following group: kaolin, bentonite, China clay, quartz, aluminum oxide, molochite, feldspar, talc, pigments and opacifiers.

5. A glaze slip for producing glazes on ceramic substrates, wherein the glaze slip contains at least 85 wt. % of a frit according to claim 1 and one or more of the substances from the following group: kaolin, bentonite, China clay, quartz, aluminum oxide, molochite, feldspar, talc, pigments and opacifiers.

6. A glaze slip for producing glazes on ceramic substrates, wherein the glaze slip contains at least 85 wt. % of a frit according to claim 2 and one or more of the substances from the following group: kaolin, bentonite, China clay, quartz, aluminum oxide, molochite, feldspar, talc, pigments and opacifiers.

* * * * *